US009615293B1

(12) United States Patent
McCarthy

(10) Patent No.: US 9,615,293 B1
(45) Date of Patent: *Apr. 4, 2017

(54) SYSTEM TO FORM AND MANAGE BONDED CHANNEL COMPRISING SATELLITE AND WIFI BANDWIDTH

(71) Applicant: Maritime Telecommunications Network Inc., Miramar, FL (US)

(72) Inventor: Kevin McCarthy, Key Biscayne, FL (US)

(73) Assignee: Global Eagle Entertainment Inc., Marina Del Rey, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/184,451

(22) Filed: Feb. 19, 2014

Related U.S. Application Data

(63) Continuation of application No. 13/957,335, filed on Aug. 1, 2013, now Pat. No. 9,185,603.

(60) Provisional application No. 61/678,571, filed on Aug. 1, 2012, provisional application No. 61/699,933, filed on Sep. 12, 2012, provisional application No. 61/726,698, filed on Nov. 15, 2012.

(51) Int. Cl.
*H04W 28/20* (2009.01)
*H04W 72/04* (2009.01)

(52) U.S. Cl.
CPC ......... *H04W 28/20* (2013.01); *H04W 72/044* (2013.01)

(58) Field of Classification Search
None
See application file for complete search history.

(56) References Cited

U.S. PATENT DOCUMENTS

| | | | | |
|---|---|---|---|---|
| 8,909,220 B1* | 12/2014 | Aftahi | .................. | H04B 7/2041 370/316 |
| 9,185,603 B1* | 11/2015 | McCarthy | ............. | H04W 28/20 |
| 2004/0229616 A1* | 11/2004 | Dutta | ................. | H04B 7/18541 455/436 |
| 2008/0080436 A1* | 4/2008 | Sandhu | ............... | H04W 52/241 370/338 |
| 2008/0130495 A1* | 6/2008 | Dos Remedios | ... | H04L 12/5695 370/230 |
| 2010/0118769 A1* | 5/2010 | Agarwal | ............ | H04B 7/18578 370/321 |

* cited by examiner

*Primary Examiner* — Huy D Vu
*Assistant Examiner* — James P Duffy
(74) *Attorney, Agent, or Firm* — FSP LLC

(57) ABSTRACT

A process for managing satellite bandwidth available to a moving vessel includes configuring a satellite to associate the vessel with a group of multiple vessels; configuring the satellite to guarantee a committed information rate (CIR) bandwidth to the vessel and to associate a maximum information rate (MIR) with the vessel, and to combine the CIR of the vessel into a CIR bandwidth pool for the group of vessels, and to combine the MIR of the vessel into a MIR bandwidth pool for the group of vessels, and to provide the vessel with a priority burst rate up to the combined CIR bandwidth of the group of vessels, and to provide the vessel with a burst rate up to the combined MIR bandwidth of the group of vessels, conditional on availability of bandwidth beyond the combined CIR bandwidth of the group of vessels; and re-configuring the satellite to release the guarantee of CIR bandwidth for the vessel upon the vessel gaining access to a terrestrial network connection of higher speed than the satellite connection.

15 Claims, 11 Drawing Sheets

FIG 4    NOT TO SCALE

SYSTEM TO FORM AND MANAGE BONDED CHANNEL COMPRISING SATELLITE AND WIFI BANDWIDTH

PRIORITY CLAIM

This application claims priority under 35 U.S.C. 119 to provisional application no. U.S. 61/678,571, filed on Aug. 1, 2012, and under 35 U.S.C. 119 to provisional application no. U.S. 61/699,933, filed on Sep. 12, 2012, and under 35 U.S.C. 119 to provisional application no. U.S. 61/726,698, filed on Nov. 15, 2012, each of which is incorporated herein by reference in its entirety.

BACKGROUND

Multiple moving communication platforms (MCPs, e.g., ships, trucks, trains, busses) may come into communication range of multiple shore-side antennas (antennas fixed to the surrounding area). Communication between antennas onboard the MCPs and the shore-side antennas should be established in an efficient and logical manner, and any satellite bandwidth utilized by the MCPs should be efficiently managed according to dynamic factors.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Figure 1:
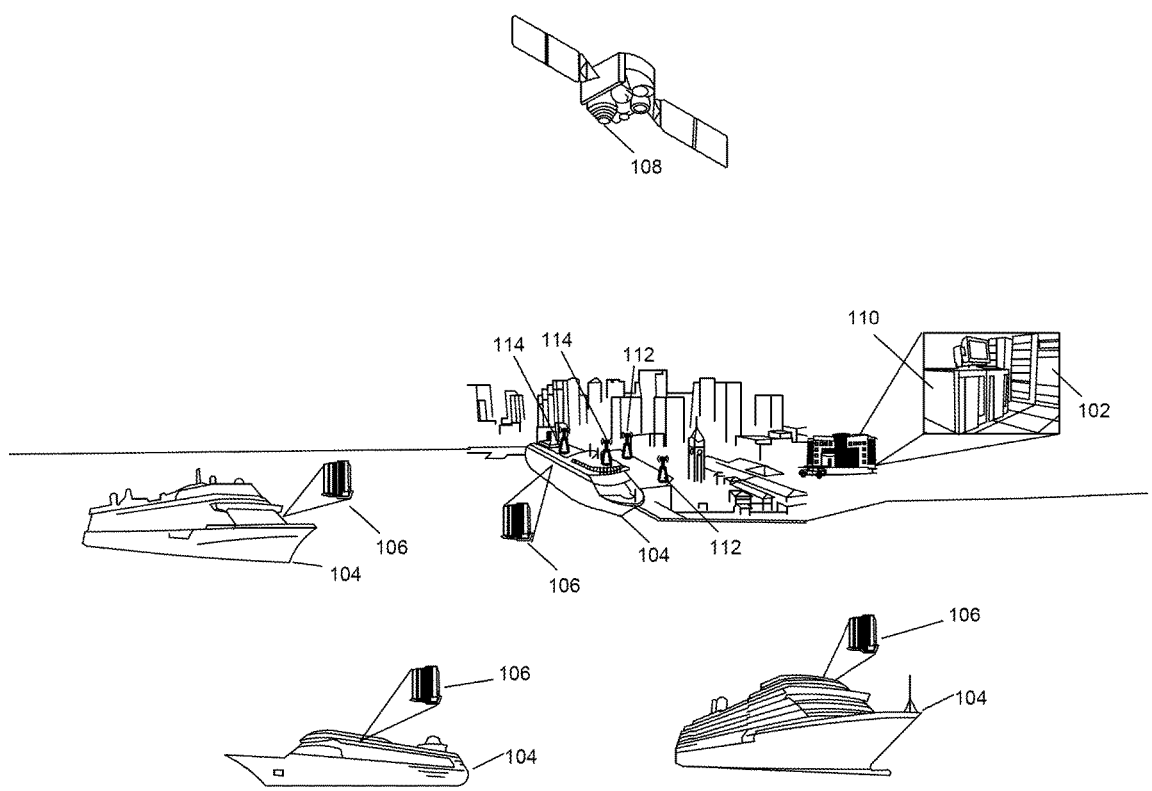
FIG. 1 illustrates a communication environment for multiple moving communication platforms (e.g., ships) that utilize satellite communication and port-side antennae.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

The following terminology and acronyms may be used in the description which follows:

CIR: Committed Information Rate—the guaranteed minimum amount of bandwidth committed to a customer, application or remote site MIR: Maximum Information Rate—the maximum amount of bandwidth allocated to a customer, application or remote site based on availability and not guaranteed Bandwidth Pool: A specific segment of bandwidth that is typically shared between multiple customers, sites or ships in a region.

VSAT: Very Small Aperture Terminal

Wireless: includes WIFI, LTE, WIMAX, 3G, 4G and any other wireless communications technologies.

CBM: Central Bandwidth Manager—located in a central data center

LSS: Local Service Selector—located on individual vessels, remote sites or vehicles NMS: Network Management System MCP: Mobile Communications Platform (includes ships, land vehicles (trucks, trains, cars . . . ), and aircraft)

Shore side: Refers to any fixed (non-mobile) location in the area of an MCP.

Backhaul(back-haul): bandwidth available between a shore-side antenna and backbone networks of the Internet.

Spatial diversity: A measure of overlap between antennae pairings between antennae of an MCP and shore-side antennae. Fewer overlaps equates to higher spatial diversity. Spatial diversity may also include a measure of spatial separation between shore-side antennae or the communication channels of shore-side and MCP paired antennae.

Shore-side antenna: An antenna that is not on a moving vessel; a fixed-location antenna.

Application: Logic that executes as one or more processes of a device operating system.

Real-time: Events or actions that take place in close temporal proximity to their cause or stimulus.

Predictive coupling: An antenna pairing decision made prior to actual communication contact between the antennas.

Port: In the context of an MCP location, refers to a location where an MCP can dock/park and where passengers can typically disembark.

Bandwidth allocation: Reservation of bandwidth resources on a communication channel.

WiFi (Wi-Fi): Wi-Fi is the name of a popular wireless networking technology that uses radio waves to provide wireless high-speed Internet and network connections. A common misconception is that the term Wi-Fi is short for "wireless fidelity," however this is not the case. Wi-Fi is simply a trademarked term meaning IEEE 802.11x. The Wi-Fi Alliance, the organization that owns the Wi-Fi (registered trademark) term specifically defines Wi-Fi as any "wireless local area network (WLAN) products that are based on the Institute of Electrical and Electronics Engineers' (IEEE) 802.11 standards." Initially, Wi-Fi was used in place of only the 2.4 GHz 802.11b standard, however the Wi-Fi Alliance has expanded the generic use of the Wi-Fi term to include any type of network or WLAN product based on any of the 802.11 standards, including 802.11b, 802.11a, dual-band, and so on, in an attempt to stop confusion about wireless LAN interoperability.

Overview

Systems, devices, and processes are described for managing satellite bandwidth available to a moving vessel utilizing a satellite communication channel. The systems, devices, and processes involve configuring a satellite providing the communication channel to associate the vessel with a group of multiple vessels, to guarantee a committed information rate (CIR) bandwidth to the vessel, to associate a maximum information rate (MIR) with the vessel, to combine the CIR of the vessel into a CIR bandwidth pool for the group of vessels, to combine the MIR of the vessel into a MIR bandwidth pool for the group of vessels, to provide the vessel with a priority burst rate up to the combined CIR bandwidth of the group of vessels, to provide the vessel with a burst rate up to the combined MIR bandwidth of the group of vessels, conditional on availability of bandwidth beyond the combined CIR bandwidth of the group of vessels, and re-configuring the satellite to release the guarantee of CIR bandwidth for the vessel upon the vessel gaining access to a terrestrial network connection of higher speed than the satellite connection.

The satellite may be reconfigured to release the guarantee of CIR bandwidth for the vessel upon the vessel gaining access to a wireless terrestrial network connection to another moving vessel, or upon the vessel gaining access to a wireless terrestrial network connection to a fixed port antenna. The satellite may be reconfigured to increase the guaranteed CIR of other vessels in the group upon the release of the guarantee of CIR bandwidth for the vessel. The satellite may be reconfigured to release the guarantee of CIR bandwidth for the vessel upon the vessel gaining access to a terrestrial network connection of higher speed than the satellite connection, and to configure a new lower but nonzero guarantee of CIR for the vessel. The satellite may be configured to guarantee a committed information rate (CIR) bandwidth to the vessel where the CIR guarantee for the vessel is influenced by a number of pending and unfulfilled network content requests to a local service selector of the vessel.

DESCRIPTION

Referring to FIG. 1, bandwidth allocation and connection setup for MCPs 104 utilizing satellite 108 communications is managed and controlled by two independent but cooperating systems. They are:
1) Central Bandwidth Manager (CBM) 102
2) Local Service Selectors (LSS) 106 that are mobile and located on each MCP 104

The CBM 102 is responsible for the overall monitoring and control of the bandwidth/connection allocation process. The CBM 102 interfaces with various Network Management Systems 110 (like the iDirect NMS), to obtain real-time bandwidth allocation and utilization data at the network, MCP 104 and application levels. The CBM 102 also interfaces with the LSSs 106 on each MCP 104 to determine the status of the connectivity options available to each MCP. The LSS 106 is responsible for making local routing decisions based on real-time connectivity circumstances as well as pre-set rules and thresholds. The LSSs 106 routing decisions can also be driven by commands from the CBM 102. Once a routing decision is made and executed, the CBM 102 instructs the relevant NMS 110 to reallocate the bandwidth across the remaining MCPs 104.

In one embodiment, an MCP is fitted with multiple wireless (e.g., WiFi) antennas 114. The MCP includes logic to perform predictive coupling between (1) the multiple on-board antennas 114 and (2) multiple fixed antennas 112 in the area around a current location of the MCP. A communication channel to a satellite 108 is utilized to ascertain features of the fixed antennas 112 before the MCP reaches port, i.e. before the MCP comes into communication range of the fixed antennas 112. The MCP's velocity and trajectory, along with its known destination or route, may be taken into account when evaluating which fixed antennas 112 to pair with which on-board antennas 114. Other factors of interest may include the back-haul available bandwidth of the fixed antennas 112 and the front-side available bandwidth of the fixed antennas 112. Each of these last two factors may be influenced by the presence or predicted presence of other MCP's in the area of the fixed antennas 112 (e.g., at the same port).

Figure 2:
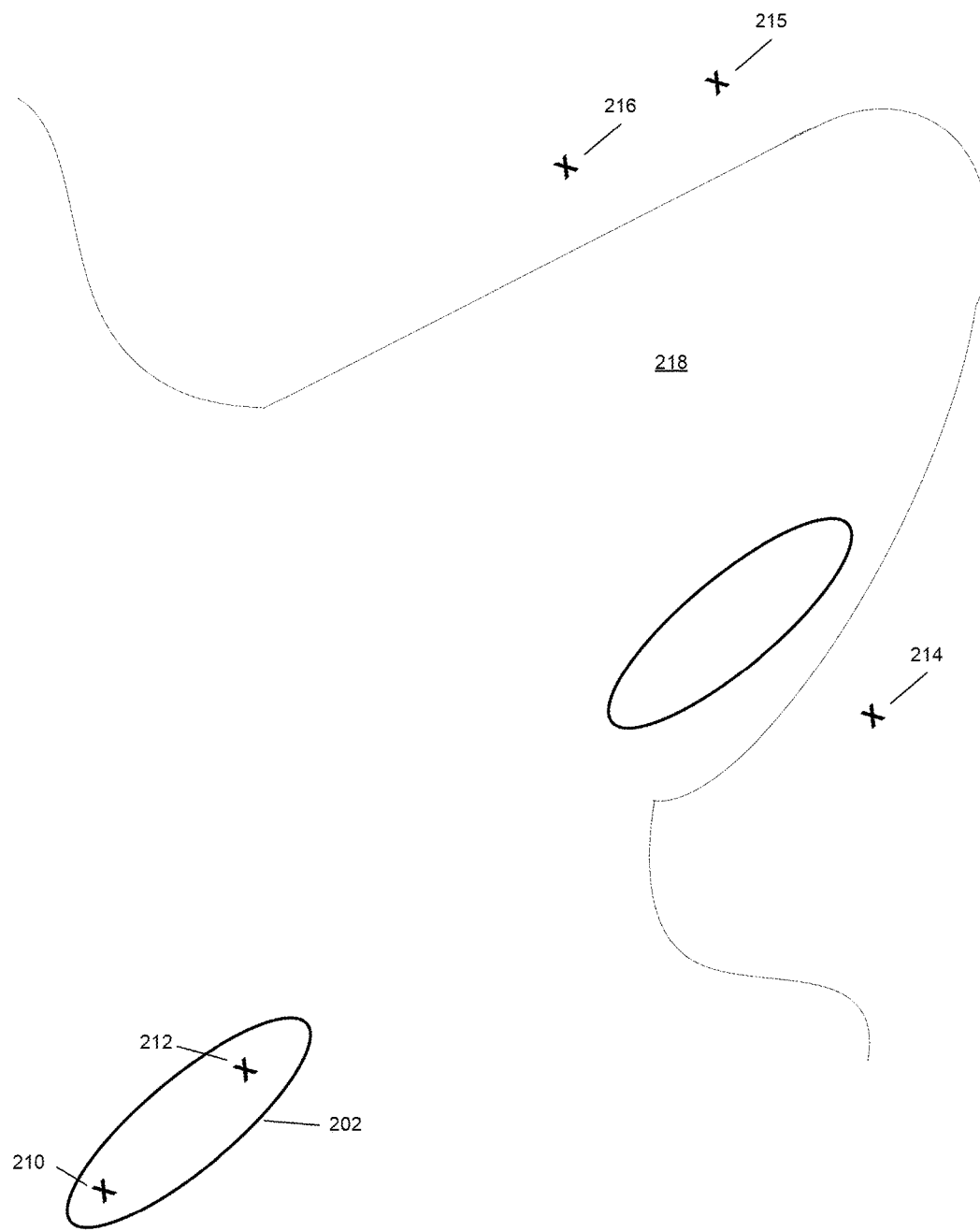
FIG. 2 illustrates an example of predictive spatial coupling for a ship approaching a port.
Figure 5:
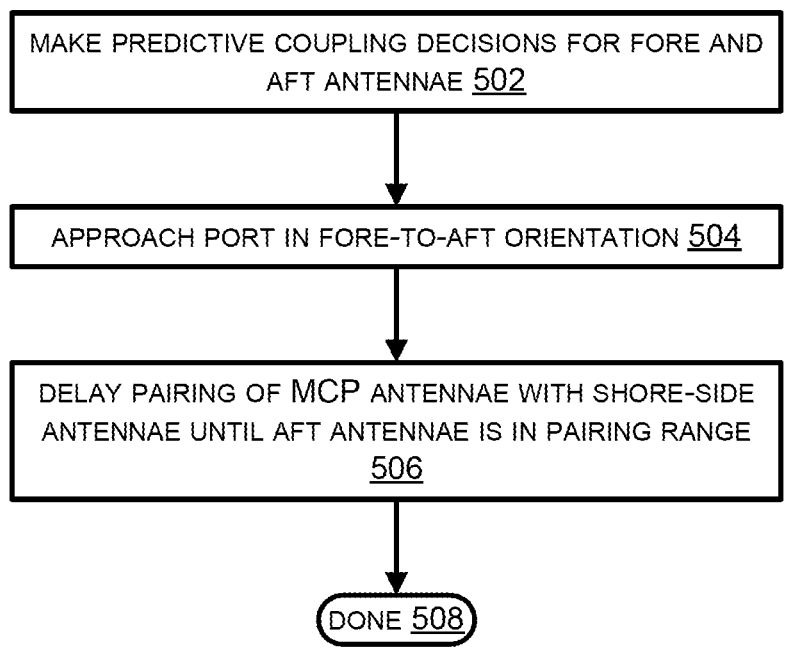
FIG. 5 is a flow chart illustrating an embodiment of one aspect of a bandwidth allocation process.

FIG. 2 illustrates an effect of predictive coupling in an example situation in which an MCP 202 is approaching a port and includes two on-board antennas 210 and 212, one forward and one aft. FIG. 5 is a flow chart illustrating an embodiment of a related aspect of a bandwidth allocation process. In this aspect, the following actions take place: make predictive coupling decisions for fore and aft antennae (502); approach port in fore-to-aft orientation (504); delay pairing of MCP antennae with shore-side antennae until aft antennae is in pairing range (506); and conclude processing of this aspect (508).

Three fixed antennas 214, 215, and 216 at the port are located on various sides of a channel 218. The ship's trajectory brings the forward antenna 210 into communication range of the fixed antenna 214 first. A predictive evaluation by the MCP 202 before coming into range of the port antennas has however indicated that, due to the presence of other MCPs at the port, the back-haul bandwidth of antenna 214 is limited, rendering antenna 214 less suitable than antennas 215 or 216 for coupling with forward antenna 210. Communication with the shore-side antennas is thus delayed until aft antenna 212 comes into communication range of antenna 214. As previously noted, antenna 214 has a limited back-haul bandwidth capacity as compared with fixed antennas 215 and 216. However, pairing antenna 212 with antenna 214 may achieve higher spatial diversity than pairing antenna 212 with antenna 215, and will also enable communication between the MCP and the port sooner. Thus, antenna 214 is selected to pair with antenna 212, and antenna 216 is selected to pair with antenna 210.

In some implementations, the predicted trajectories of MCPs at the port, or approaching or leaving the port, may also be taken into account. Thus, if antenna 214 has a limited back-haul capacity presently due to utilization by one or more MCPs at the port, but one or more of those MCPs is predicted to leave the port within a certain time frame, this may impact the weight given to the limited back-haul capacity of antenna 214 in the evaluation of whether to pair it with the forward or aft antennas 210, 212 (because the limited back-haul may in fact be less limited within the time-frame for the approaching MCP).

Figure 6:
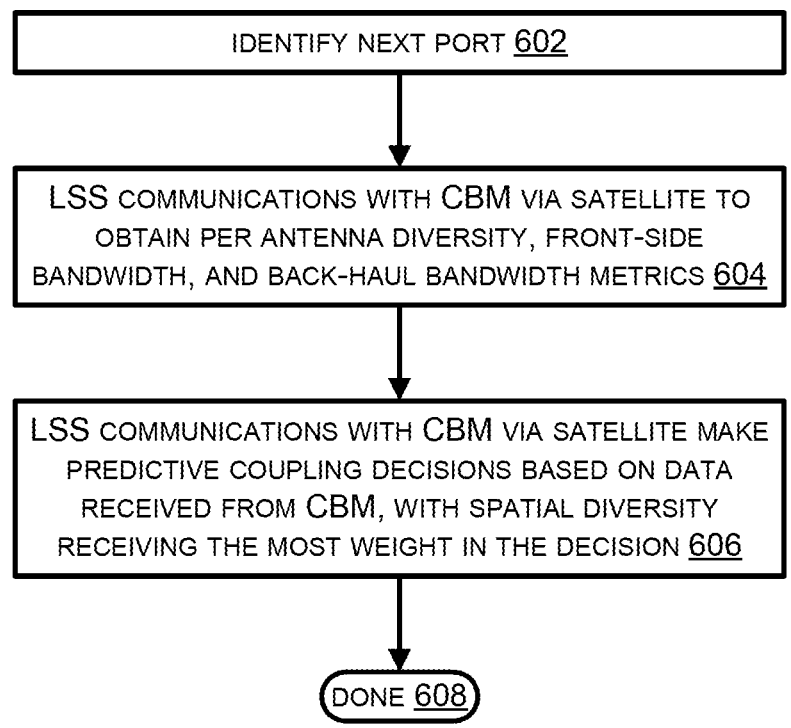
FIG. 6 is a flow chart illustrating an embodiment of one aspect of a bandwidth allocation process.

Thus, a device of the MCP (e.g., the LSS) may include logic for pairing antennae on the MCP with fixed antennae in an area surrounding the MCP. The LSS may communicate via a satellite uplink to obtain location information, front side bandwidth information, and backside bandwidth information for the fixed antennae. FIG. 6 is a flow chart illustrating an embodiment of this aspect of a bandwidth allocation process. In this aspect, the following actions take place: identify next port (602); LSS communications with CBM via satellite to obtain per antenna diversity, front-side bandwidth, and back-haul bandwidth metrics (604); LSS communications with CBM via satellite make predictive coupling decisions based on data received from CBM, with spatial diversity receiving the most weight in the decision (606); and conclude processing of this aspect (608).

The LSS may predict a pairing the antennae on the MCP with the fixed antennae, according to $$E=A*\text{diversity}+C*\text{front side bandwidth}+D*\text{backhaul bandwidth}$$

where A, C, and D are weighting functions or constants, and where the term A*diversity has greater weight than the other terms that determine E.

In one embodiment, the MCP includes logic to seek maximum spatial diversity between (1) the multiple on-board antennas 114 and (2) multiple fixed antennas 112 in the area around a current location of the MCP. i.e. shore side. Maximum spatial diversity means the MCP attempts to pair each on-board antenna 114 with exactly one shore side antenna 112, and vice versa. This maximum diversity is prioritized over signal strength between the on-board antennas and the fixed antennas. In other words, achieving maximum spatial diversity between the antennas is the primary consideration informing the unique pairings, and signal strength is a secondary consideration that may be overruled by the consideration of maximum spatial diversity.

The logic on board the MCP may further take into account the available bandwidth on the links connecting the fixed antennas 112 to the Internet, known as backhaul or backlinks. When selecting which on-board antenna to pair with which fixed antenna, a weighted determination may be based on (1) the effect of the pairing on spatial diversity, (2) the strength of the signal between the on-board and fixed antenna, (3) the bandwidth available between the on-board antenna and the fixed antenna, i.e. front-side bandwidth (affected by but not solely determined by #2), and (4) the backhaul bandwidth of the fixed antenna.

By way of example, let A, B, C, and D be weighting constants, or weighting functions. A greatest weight may be assigned to spatial diversity, i.e. no two MCP antennas connected to the same shore side antenna:

For each possible pairing of MCP and shore side antennas:
{

$$E=A*\text{diversity}+B*\text{signal strength}+C*\text{front side bandwidth}+D*\text{backhaul bandwidth} \quad [1]$$

If E>=Ebest then
Ebest=E
Endif
}
Pick pairing that yielded Ebest.

This example may be extended to a multi-variable optimization, to select the pairings that maximize average of the weighted function E over all MCP antennae.

Maximum spatial diversity may be sought and selected for the antennas on board the MCP and the fixed antennas in the surrounding area even at the cost of some signal strength, front side bandwidth, and/or backhaul bandwidth between the on board antennas and the fixed antennas.

Figure 7:
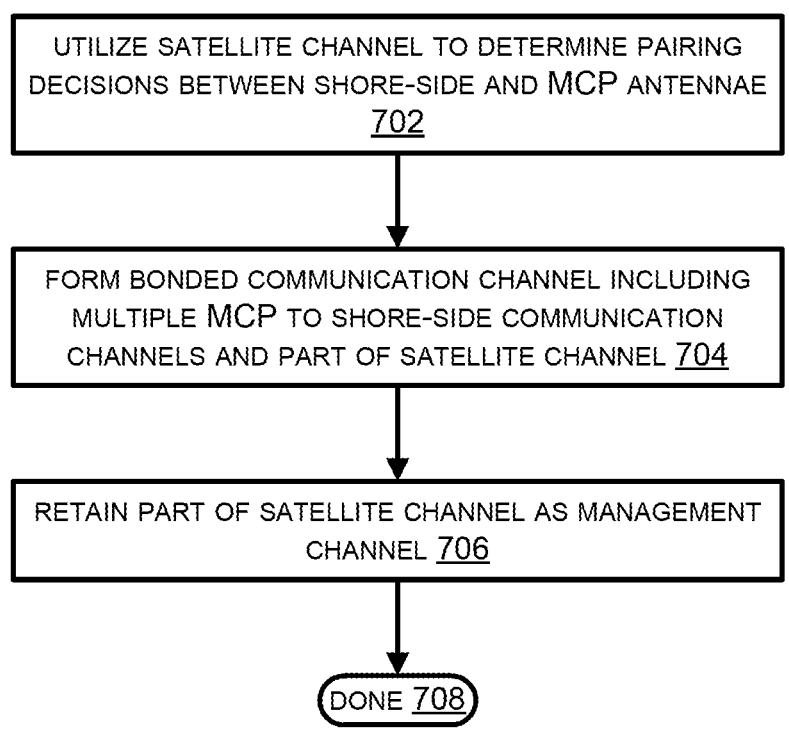
FIG. 7 is a flow chart illustrating an embodiment of one aspect of a bandwidth allocation process.

In one embodiment, a satellite uplink aboard the MCP is utilized to ascertain available backhaul and/or front side bandwidth for each shore side antenna, and/or to set the backhaul and/or front side bandwidth allocated to each on-board antenna. A bonded communication channel may be formed from the set of channels between MCP and fixed antenna, and the satellite channel as well. Thus, a satellite channel may be used to determine pairings between on-board antennae and shore-side antennae, and as a management channel for connections from the MCP to shore side antennae, and once the connections to shore side are established, the satellite channel may be bonded into a single logical channel that includes the shore side connections, so that connection management signals and data traffic are both carried (potentially or actually) over all of the connections (satellite and shore side) available to the MCP. FIG. 7 is a flow chart illustrating an embodiment of this aspect of a bandwidth allocation process. In this aspect, the following actions take place: utilize satellite channel to determine pairing decisions between shore and MCP antennae (702); from bonded communication channel including multiple MCP to shore-side communication channels and part of satellite channel (704); retain part of satellite channel as management channel (706); and conclude processing of this aspect (708).

Figure 3:
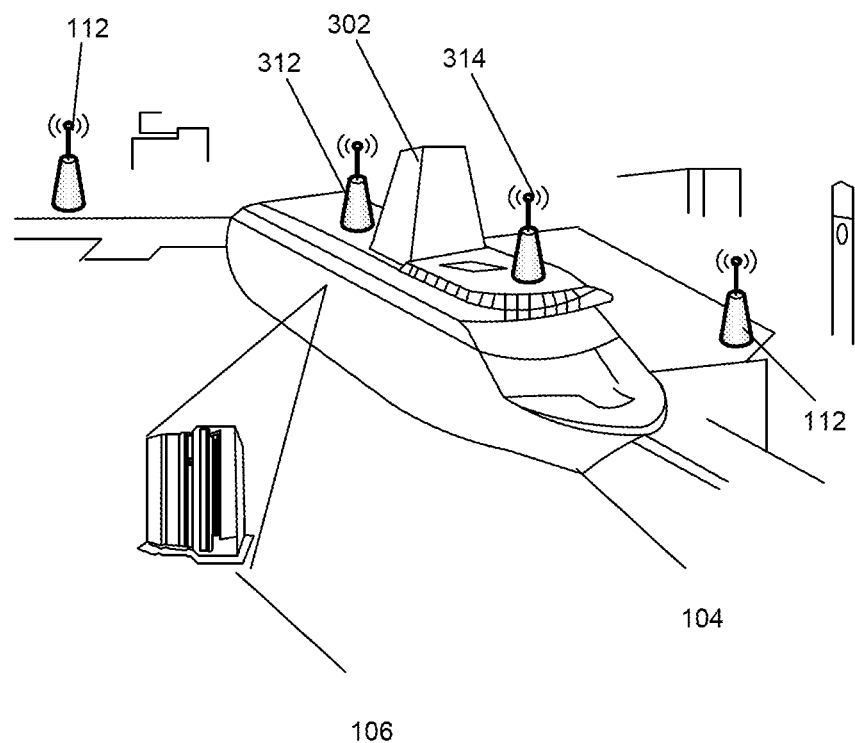
FIG. 3 illustrates an embodiment of a two antennae layout for an MCP having a wireless obstruction.
Figure 8:
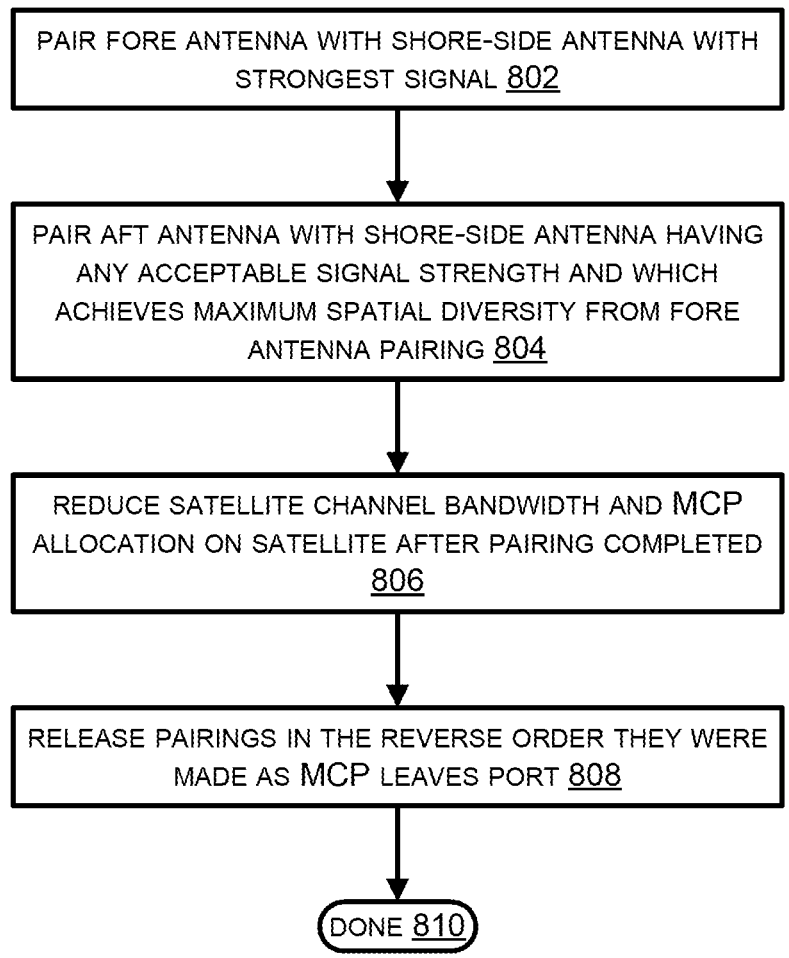
FIG. 8 is a flow chart illustrating an embodiment of one aspect of a bandwidth allocation process.

FIG. 3 illustrates an embodiment of a two antennae layout for an MCP having a wireless obstruction. Each antenna 312, 314 is a stabilized tracking antenna. One antenna 312 is located at or toward an aft end (trailing motion end) of the MCP 104 (in this example, a ship), and one antenna 314 is located at or toward a forward end of the MCP 104 (forward motion end). A wireless communication obstruction 302 is interposed between the two antennae. FIG. 8 is a flow chart illustrating an embodiment of this aspect of a bandwidth allocation process. In this aspect, the following actions take place: pair fore antenna with shore-side antenna with strongest signal (802); pair aft antenna with shore-side antenna having any acceptable signal strength and which achieves maximum spatial diversity from fore antenna pairing (804); reduce satellite channel bandwidth and MCP allocation on satellite after pairing completed (806); release pairings in the reverse order they were made as MCP leaves port (808); and conclude processing of this aspect (810).

In this embodiment the LSS 106 obtains the GPS coordinates of the shoreside antennas 112, including altitude data, before any connection is established between the on board antennas 312, 314 and the shore side antennas 112. The GPS data may in fact be obtained and filtered based upon the MCP's location, trajectory, speed, expected course and/or destination, and other factors, to predict which shore side antennas will be (1) within communication range, (2) when, and (3) for how long, in the future. The LSS 106 may first connect the forward antenna 314 to the shore side antenna exhibiting a strongest signal above an acceptable threshold signal level. In other words, in the equation [1] above, A=C=D=0 for the decision of which of the shore side antennas 112 to couple with the forward antenna 314 as the MCP 104 approaches a port. The aft antenna 312 is then paired with any other shore side antenna of acceptable signal strength, except the one paired with the forward antenna 314. In other words, for aft antenna 312, C=D=0 once the forward antenna 314 has been paired with a shore side antenna. The weight given to achieving spatial diversity is overriding in the pairing decision for antenna 312, even if the signal from the shoreside antenna paired with the forward antenna 314 is much stronger.

Throughout the process of pairing shore side antennae with onboard antennae, a communication channel is maintained between the MCP 104 and a satellite 108, although the amount of bandwidth reserved for the MCP 104 on this channel may be reduced once connectivity to a shore side antenna 112 is established.

In one embodiment, connections between the on board antennae 312, 314 and the shore side antennae 112 are released in the same order as they are made as the MCP 104 departs from the port. Releasing a connection to a shore side antenna 112 may cause a reallocation (increase in allocation) of satellite bandwidth afforded to the MCP 104.

Dynamic Re-Provisionine of Satellite Pool Bandwidth

A pool of satellite bandwidth is allocated among MCPs based upon the connectivity circumstances of the MCPs. The connectivity circumstances of a particular MCP may include whether it has access to an alternate connection to the network (e.g., port WiFi), its location, whether it is proximate to another MCP that provides uplink bandwidth, whether it has just arrived to port or will soon depart, predicted weather patterns, passenger count and other considerations, such as:

Bandwidth cost
Link performance and availability
Link latency
MCP itinerary or course
Bandwidth availability
Customer preferences
Network load balance A pool of satellite bandwidth shared among all MCPs in a group of MCPS may be allocated according to the connectivity circumstances of one or more particular MCPs or applications and services within MCPs, and/or a statistical model derived from circumstances of multiple MCPs in the group. Other factors for determining an MCPs allocation of the satellite bandwidth pool include how many/what types (e.g., how large) content requests are pending on an MCP, how long before those content requests can be fulfilled using a directed high-bandwidth beam, and/or how many premium bandwidth purchases are submitted by people on the MCP.

MCPs may be grouped according to factors including MCP ownership, MCP type, geographic location, occupancy, bandwidth demands (which may be a function of connectivity plan purchases by the MCP's occupants), routes, connectivity circumstances, application requirements, and various other technical, environmental and commercial factors.

Referring to FIG. 1, bandwidth allocation for satellite 108 communications is managed and controlled by two independent but cooperating systems. They are:
1) Central Bandwidth Manager (CBM) 102
2) Local Service Selectors (LSS) 106 that are mobile and located on each MCP 104

The CBM 102 is responsible for the overall monitoring and control of the bandwidth allocation process. The CBM 102 interfaces with various Network Management Systems 110 (like the iDirect NMS), to obtain real-time bandwidth allocation and utilization data at the network, MCP 104 and application levels. The CBM 102 also interfaces with the LSSs 106 on each MCP 104 to determine the status of the connectivity options available to each MCP. The LSS 106 is responsible for making local routing decisions based on real-time connectivity circumstances as well as pre-set rules and thresholds. The LSSs 106 routing decisions can also be driven by commands from the CBM 102. Once a routing decision is made and executed, the CBM 102 instructs the relevant NMS 110 to reallocate the bandwidth across the remaining MCPs 104.

Example

Referring to FIG. 2, each of two cruise ships belonging to a common cruise line is allocated between 1 Mb of a 10 Mbps pool of bandwidth on a specific satellite covering the Caribbean region. All of the ships are equipped with VSAT and long range WIFI antennas. Several ports along the itinerary of the vessels are equipped with WIFI base stations. Each vessel is allocated a 1 Mbps CIR, burstable to a 3 Mbps MIR, within the 10 Mbps pool.

Figure 9:
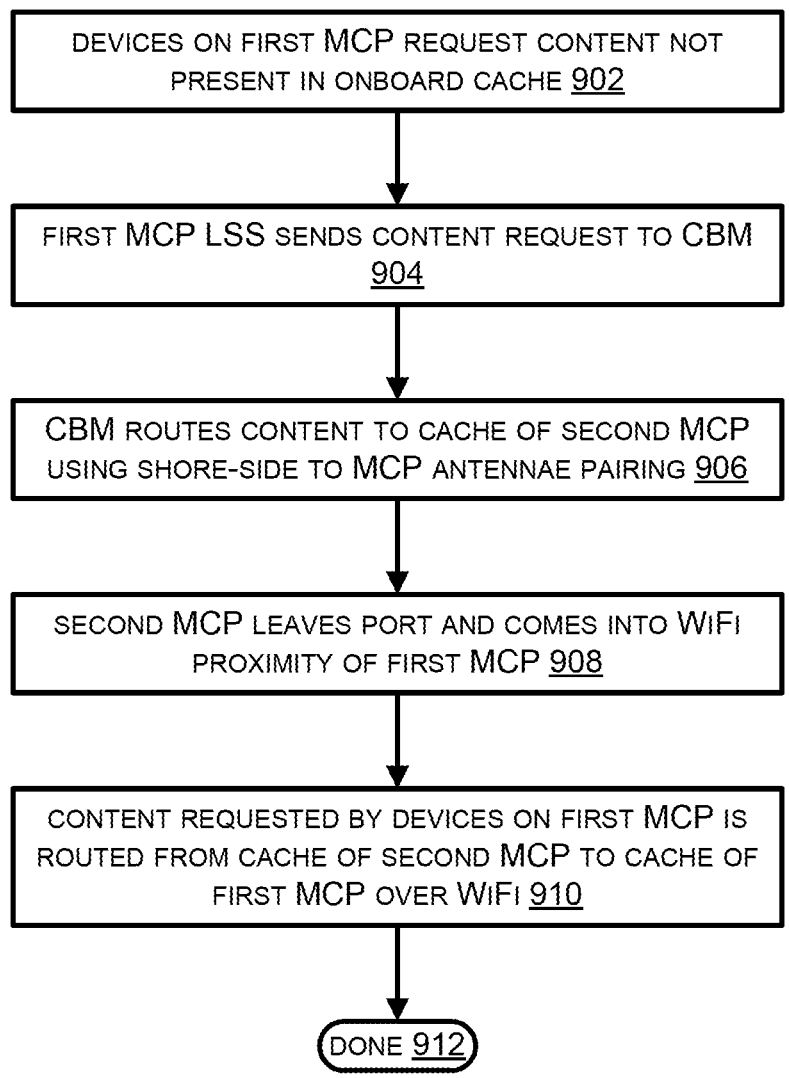
FIG. 9 is a flow chart illustrating an embodiment of one aspect of a bandwidth allocation process.

Ship B is at port, and ship A is far at sea. Devices on ship A request content that is not available on the LSS of ship A. The requests are routed via satellite to the LSS of ship B, which downloads the content from the port content aggregator. Ship B then leaves port. As ship "A" enters within WiFi range of ship B, the LSS device onboard ship A requests the missing content from the LSS of ship B. The LSS of ship B provides the content to the LSS of ship A. FIG. 9 is a flow chart illustrating an embodiment of this aspect of a bandwidth allocation process. In this aspect, the following actions take place: devices on first MCP request content not present in onboard cache (902); first MCP LSS sends content request to CBM (904); CBM routes content to cache of second MCP using shore-side to MCP antennae pairing (906); second MCP leaves port and comes into WiFi proximity of first MCP (908); content requested by devices on first MCP is routed from cache of second MCP to cache of first MCP over WiFi (910); and conclude processing of this aspect (912).

Dynamic, Burstable Bandwidth Pools

When multiple MCPs of a group meeting a common criterion (e.g., belonging to the same customer or fleet) are uplinked through the same one or more satellites, their CIRs (Committed Information Rate) and MIR's (Maximum Information Rate), may be combined into a burstable bandwidth pool. This pool allows each MCP in the group of MCPs to have priority access to the group aggregate CIR, while being able to burst up to the group aggregate MIR. Each MCP maintains its original CIR inside the pool, but their individual MIRs are set to the aggregate MIR of the pool.

The MCP pool may be configured inside a larger network, along with MCPs (or MCP pools) from other groups (e.g., other fleets). MCPs within each pool are guaranteed their full CIR, but have priority to burst up to the aggregate CIR of their pool. They can also burst above the aggregate CIR, up to the aggregate MIR, if bandwidth is available. This may improve burstability for the MCPs inside the pool, it may help ensure that MCPs within the group have priority access to any idle bandwidth within their group (instead of idle bandwidth being available to any MCP on the network, and if idle bandwidth is available in the larger network (outside the pool), MCPs within the pool can still burst into it, up their aggregate MIR.

When an MCP has access to an alternate network connection (e.g., WiFi), the MCP's idle satellite bandwidth automatically becomes available to the remaining MCPs in the pool comprising the MCP, instead of to any MCP on the network.

Figure 10:
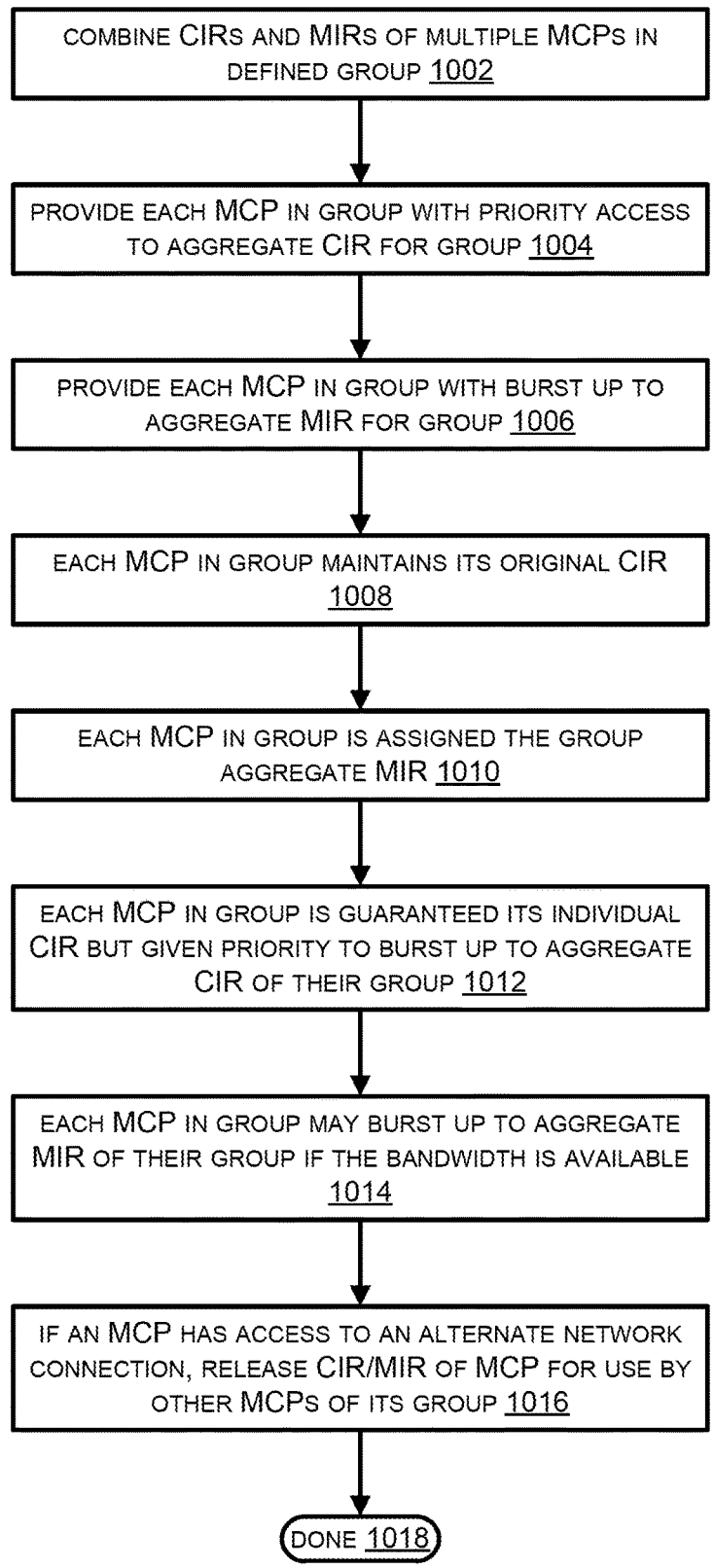
FIG. 10 is a flow chart illustrating an embodiment of one aspect of a bandwidth allocation process.

FIG. 10 is a flow chart illustrating an embodiment of this aspect of a bandwidth allocation process. In this aspect, the following actions take place: combine CIRs and MIRs of multiple MCPs in defined group (1002); provide each MCP in group with priority access to aggregate CIR for group (1004); provide each MCP in group with burst up to aggregate MIR for group (1006); each MCP in group maintains its original CIR (1008); each MCP in group is assigned the group aggregate MIR (1010); each MCP in group is guaranteed its individual CIR but given priority to burst up to aggregate CIR of their group (1012); each MCP in group may burst up to aggregate MIR of their group if the bandwidth is available (1014); if any MCP has access to an alternate network connection, release CIR/MIR of MCP for use by other MCPs of its group (1016); and conclude processing of this aspect (1018).

Example

Stand Alone Configuration

MCP—CIR/MIR
SHIP-A—1000/2000
SHIP-B—500/1000
SHIP-C—2000/4000

Dynamic Burstable Pool Configuration

Pool CIR/MIR
POOL-ABC—3500/7000
MCP—CIR/MIR
SHIP-A—1000/7000
SHIP-B—500/7000
SHIP-C—2000/7000
Sample Scenarios
If all three ships are active they would each be guaranteed their respective CIRs.
If ships B and C are idle (or for example on WiFi), ship A would have guaranteed access to the aggregate CIR of the pool (3500).
If there is idle bandwidth available on the larger network, ship A could also burst up to the aggregate MIR of the pool (7000).

In one embodiment, WiFi communications is preferred over satellite communications provided the WiFi signal strength is sufficient to provide a minimum throughput and packet loss. Thus, the WiFi channel will be utilized and the satellite channel deallocated (except in some cases for a small reserved amount of satellite bandwidth for the MCP regardless of WiFi signal strength). These thresholds may be configurable and dynamic according to real-time factors such as weather, geographic region, or time of day. In some cases communication traffic may be balanced or otherwise shared over both satellite and WiFi links. For example, in some cases voice traffic may be routed over satellite and Internet-bound traffic over WiFi.

Pro-Rata Backlink Allocation and Effect on Uplink Pool Allocation

When an MCP has access to an alternate network connection (e.g., WiFi), the MCP's idle satellite bandwidth automatically becomes available to the remaining MCPs in the pool comprising the MCP, instead of to any MCP on the network. However, in one embodiment a predictive analysis of backlink bandwidth utilization will result in the MCP being allocated less bandwidth than is actually presently available on the backlink.

Figure 4:
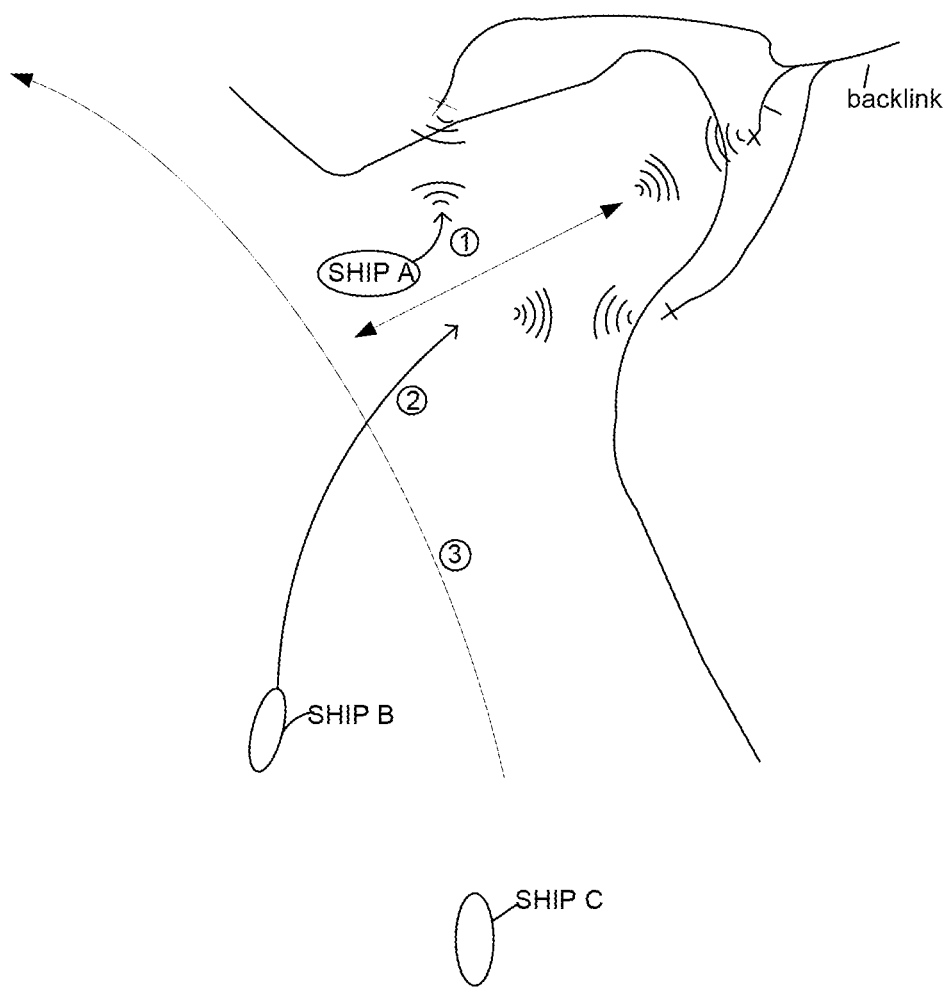
FIG. 4 illustrates an embodiment of a situation in which predictive pro-rata backlink bandwidth allocation may be performed for a group of MCPs.

FIG. 4 illustrates an embodiment of a situation in which predictive pro-rata backlink bandwidth allocation may be performed for a group of three MCPs (in this example, ships). The Dynamic Burstable Pool Configuration for the group is:

CIR/MIR
3500/7000

At time (1), ship A is approaching WiFi range of a port with a fixed antenna system (three fixed antennas sharing one backlink). At this point in time, the total available backlink bandwidth is 2000 Mbps (the backlink is being utilized by other ships, or land-based users, that aren't part of the group). The bandwidth allocations for the ships in the group are as follows:

|  | CIR | MIR | Backlink |
| --- | --- | --- | --- |
| SHIP-A | 1000 | 7000 | 0 |
| SHIP-B | 500 | 7000 | 0 |
| SHIP-C | 2000 | 7000 | 0 |

The LSS aboard each ship is in communication with the CBM, which tracks the ship's speed and trajectories and their scheduled destinations. The CBM predicts that each of ships A, B, and C will come into range of the port antennas during some concurrent time in the near future. Ship A connects with one of the fixed shore-side antennas and is allocated backlink bandwidth.

|  | CIR | MIR | Backlink |
| --- | --- | --- | --- |
| SHIP-A | 430 | 7000 | 570 |
| SHIP-B | 785.5 | 7000 | 0 |
| SHIP-C | 2285.5 | 7000 | 0 |

Ship A is allocated 571 Mbps of backlink bandwidth, which is the 2000 Mbps of total backlink bandwidth reduced according to ship A's pro-rata share of the CIR pool (2000*1000/3500). Ship A's CIR is reduced by 571 Mbps and the CIR of each of ship B and C is increased by 285.5 Mbps (571/2). In some implementations the 571 Mbps may be split pro-rata among ships B and C according to their pro-rata share of the pool CIR. In other words, ship B could be allocated an additional 571*500/3500 of CIR and ship C an additional 571*2000/3500 of CIR.

Next ship B comes into WiFi range of a port antenna. Ship B is allocated backlink bandwidth according to its pro-rate share of the CIR before the adjustment resulting from ship A coming to port. In other words, ship B is allocated 2000*500/3500 of backlink bandwidth. Ship B's share of the CIR is reduced by this amount, and the remainder allocated to the CIR of ship C.

|        | CIR  | MIR  | Backlink |
|--------|------|------|----------|
| SHIP-A | 430  | 7000 | 570      |
| SHIP-B | 500  | 7000 | 285      |
| SHIP-C | 2570 | 7000 | 0        |

Next ship C comes into range of the port antennas. Ship C is allocated the remaining share of the available backlink bandwidth, 2000*2000/3500, and its CIR is reduced to its original allocation, with the reduced CIR allocation of ship C going back to ship A.

|        | CIR  | MIR  | Backlink |
|--------|------|------|----------|
| SHIP-A | 1000 | 7000 | 570      |
| SHIP-B | 500  | 7000 | 285      |
| SHIP-C | 2000 | 7000 | 1145     |

Unlink Sharing, Channel Bonding

Satellite channels used by multiple MCPs may be shared between the MCPs while they are within a range of one another using a high speed directed wireless data connection. Requests for satellite bandwidth from devices on one of the MCPs may be redirected to the satellite channel of another MCP across the high speed data link. MCPs' location and their headings may be identified using the satellite data link itself rather than GPS or another technique.

The above-described satellite pooling technique may be applied to MCPs that are within direct wireless communication range of one another. Thus, if SHIP A and SHIP B are within range of one another via a high speed directed wireless data connection, the two ships may be pooled and the CIR/MIR of the pool, and each individual CIR/MIR, set in accordance with the techniques described herein.

Capacity utilization of each MCP satellite channel is monitored and load balancing of channel traffic of each MCP is coordinated between the MCPs. Channel bonding may take place in some circumstances where all the bandwidth needed for a particular operation is unavailable on any one channel.

If channel bonding takes place, it may be done from the satellite modem(s) of one of the plurality of proximate MCPs. Effectively, the single MCP chosen to provide the uplink for all the MCPs may be allocated all of the uplink bandwidth for the MCPs. A shared satellite pool of bandwidth may then be reconfigured to account for the single MCP providing all of the uplink bandwidth for the MCPs. This may be accomplished in accordance with the allocation schemes described previously for CIR/MIR of MCP groups.

Content Aggregation

A content aggregator is a computer system with a large volume of mass storage. The selection of content to aggregate is based on human activity on the MCP while the MCP is limited to a low bandwidth connection. For example requests for music, video, or large files may be made using URLs and so forth from mobile devices or computer systems on a cruise ship while it is at sea, limited to a low-bandwidth satellite connection to the Internet.

Rather than attempting to fulfill these requests back to the MCP immediately, the requests may instead be cached on the LSS of the MCP. When a first MCP comes within a range of a directed hi-bandwidth beam provided from a "port", e.g. a fixed bandwidth service and/or content aggregator location (e.g., a shaped WiFi beam from a ship dock), or within beam range of a second MCP, the requested content (that which is not already cached by the LSS of the first MCP) may be directed from the port or LSS of the second MCP to the LSS of the first MCP.

Figure 11:
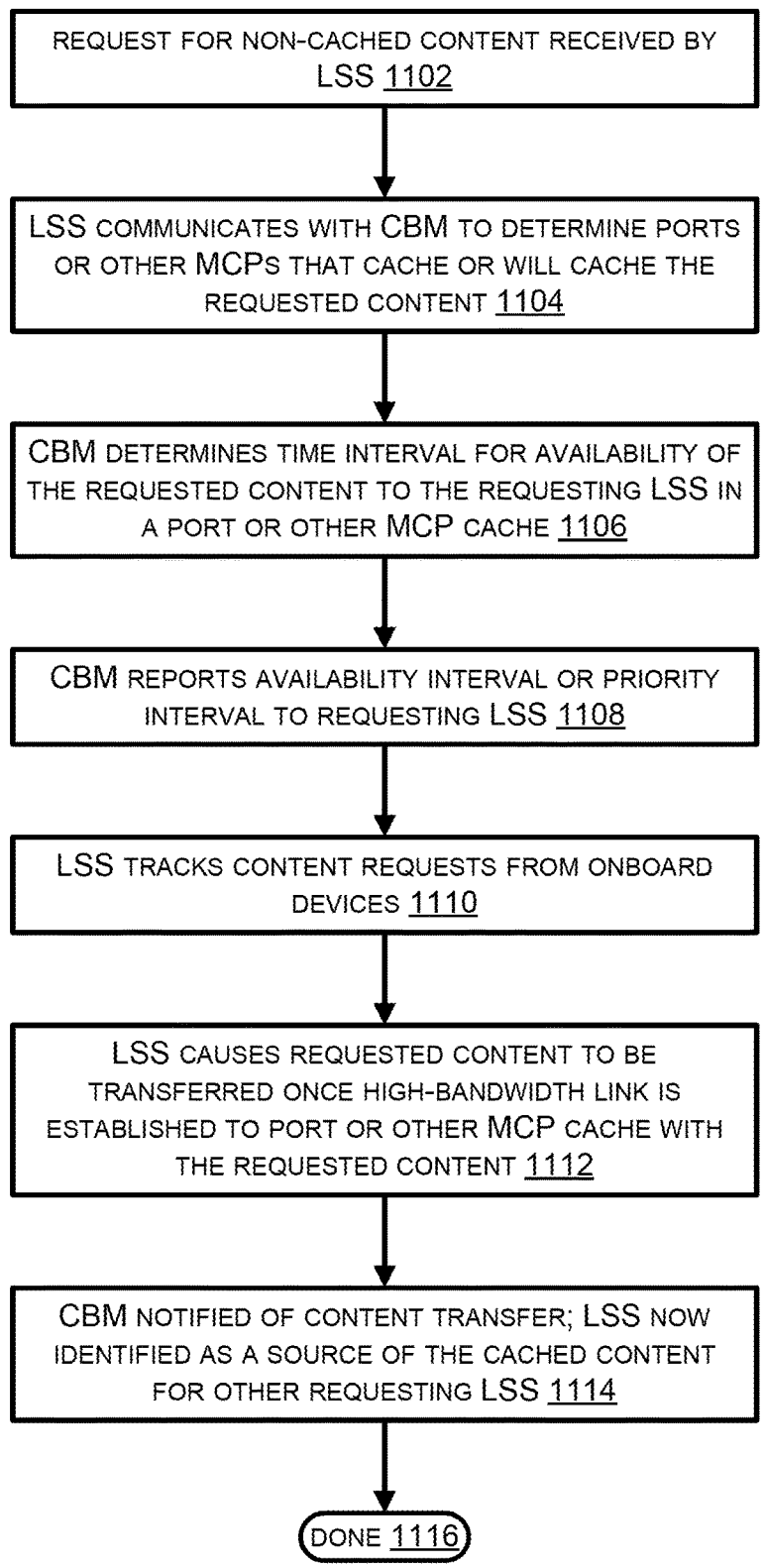
FIG. 11 is a flow chart illustrating an embodiment of one aspect of a bandwidth allocation process.

In one embodiment, when content is requested that isn't cached by the LSS, the LSS communicates with the CBM to determine one or more ports or other MCPs that cache or will cache the content. The CBM applies route, timing, and other factors to determine a time interval when the requested content will be available in a port content aggregator or the LSS of a second MCP that will be within range of a directed hi-bandwidth link of the first MCP, and reports this time interval to the requesting device. Optionally, the LSS may also provide the requesting device with an option to obtain the content sooner, for example by prioritizing the content request on the satellite connection, for a payment. FIG. 11 is a flow chart illustrating an embodiment of one aspect of a bandwidth allocation process. In this aspect, the following actions take place: request for non-cached content received by LSS (1102); LSS communicates with CBM to determine ports or other MCPs that cache or will cache the requested content (1104); CBM determines time interval for availability of the requested content to the requesting LSS in a port or other MCP cache (1106); CBM reports availability interval or priority interval to requesting LSS (1108); LSS tracks content requests from onboard devices (1110); LSS causes requested content to be transferred once high-bandwidth link is established to port or other MCP cache with the requested content (1112); CBM notified of content transfer; LSS now identified as a source of the cached content for other requesting LSS (1114); and conclude processing of this aspect (1116).

The LSS comprises logic to track and capture content (e.g., webpage) requests from devices on the MCP, and to then download the content to the LSS at an appropriate time via a directed high-bandwidth link, and to communicate it to the requesting devices at a time when the link to the first MCP to a port or second MCP has sufficient bandwidth. The aggregated content may be loaded onto the LSS and stored there once the high speed link is established. The content is then available to other MCPs which may pass within a range of a directed high speed wireless data link of the first MCP. This creates a roaming distributed content aggregator, in which content requests from devices on multiple MCPs may be aggregated at ports, and an MCP approaching or leaving the port becoming a node of the distributed aggregator from which other MCPs can pull content using a directed wireless beam. Thus, the coordinates, headings, speeds, ranges, and other information about each MCP in a content aggregation zone may be applied to establish a roaming distributed content aggregation system, so that requests from a first MCP which is far from any port may be directed to a content aggregator at port, and content placed on a second MCP that is approaching, at, or leaving the port so that the content is physically carried to within a range of the first MCP and the content then transmitted between the MCPs.

In one embodiment, the time reported for availability of content not cached in an LSS may be determined according to satellite bandwidth available to the MCP comprising the LSS, and/or time until the MCP comes within directed beam range of a port or other MCP that caches the content. A person requesting the content may be advised of a time before the content is available, and provided an option to purchase priority on the low-bandwidth satellite uplink from the MCP, to get the content sooner.

In one embodiment, the time that is reported for when the content will be available depends, at least in part, on how much satellite bandwidth from a fixed bandwidth pool is allocated to the MCP. This allocation may be varied dynamically according to how many content requests are pending, and/or the estimated time to obtain the requested content, and/or whether or how many priority bandwidth purchases are submitted for the MCP.

In one embodiment the time reported for content availability is a function of the actual or expected CIR/MIR for the MCP or its group. An expected CIR/MIR and timing thereof may be determined from real-time factors including the location of other MCPs in a fleet or other logical groupings, their expected routes, speeds, weather patterns, distance from high speed wireless access points, and other factors.

Implementations and Alternatives

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A process for managing satellite bandwidth available to a moveable vessel utilizing a satellite communication channel, the process comprising:

configuring a satellite providing the satellite communication channel to associate the vessel with a group of multiple vessels;

configuring the satellite to guarantee a committed information rate bandwidth to the vessel (vessel CIR bandwidth);

configuring the satellite to associate a maximum information rate with the vessel (vessel MIR bandwidth);

configuring the satellite to combine the vessel CIR bandwidth into a CIR bandwidth pool for a group of vessels comprising the vessel, the CIR bandwidth pool comprising a combined CIR bandwidth;

configuring the satellite to combine the vessel MIR bandwidth into a MIR bandwidth pool for the group of vessels, the MIR bandwidth pool comprising a combined MIR bandwidth;

configuring the satellite to provide the vessel with a priority burst rate up to the combined CIR bandwidth;

configuring the satellite to provide the vessel with a burst rate up to the combined MIR bandwidth, conditional on availability of the satellite bandwidth beyond the combined CIR bandwidth;

re-configuring the satellite to release the guarantee of CIR bandwidth for the vessel upon the vessel gaining access to a terrestrial network connection of higher speed than a satellite connection; and to configure a new lower but nonzero guarantee of CIR for the vessel; and operating a directed wireless data connection between the vessel and another vessel, and treating the vessel and the another vessel as a single vessel for purposes of allocating the vessel CIR bandwidth and the vessel MIR bandwidth from the CIR bandwidth pool and the MIR bandwidth pool, respectively.

2. The process of claim 1, further comprising:
re-configuring the satellite to release the guarantee of the vessel CIR bandwidth upon the vessel gaining access to a wireless terrestrial network connection to another moving vessel.

3. The process of claim 1, further comprising:
re-configuring the satellite to release the guarantee of the vessel CIR bandwidth upon the vessel gaining access to a wireless terrestrial network connection to a fixed port antenna.

4. The process of claim 1, further comprising:
re-configuring the satellite to increase a vessel CIR bandwidth of other vessels in the group of vessels upon the release of the guarantee of the vessel CIR bandwidth.

5. The process of claim 1, further comprising:
influencing the guarantee of the vessel CIR bandwidth by a number of pending and unfulfilled network content requests to a local service selector of the vessel.

6. A network bandwidth management device, comprising:
a telecommunication interface to a satellite providing a satellite communication channel;
logic to configure the satellite to associate a moveable vessel with a group of vessels;
logic to configure the satellite to guarantee a committed information rate bandwidth to the vessel (vessel CIR bandwidth);
logic to configure the satellite to associate a maximum information rate bandwidth with the vessel (vessel MIR bandwidth);
logic to configure the satellite to combine the vessel CIR bandwidth into a CIR bandwidth pool for the group of vessels, the CIR bandwidth pool comprising a combined CIR bandwidth;
logic to configure the satellite to combine the vessel MIR bandwidth into a MIR bandwidth pool for the group of vessels, the MIR bandwidth pool comprising a combined MIR bandwidth;
logic to configure the satellite to provide the vessel with a priority burst rate up to the combined CIR bandwidth of the group of vessels;

logic to configure the satellite to provide the vessel with a burst rate up to the combined MIR bandwidth of the group of vessels, conditional on availability of bandwidth beyond the combined CIR bandwidth of the group of vessels;

logic to re-configure the satellite to release the guarantee of CIR bandwidth for the vessel upon the vessel gaining access to a terrestrial network connection of higher speed than a satellite connection; and to configure a new lower but nonzero guarantee of CIR for the vessel; and logic to operate a directed wireless data connection between the vessel and another vessel, and treating the vessel and the another vessel as a single vessel for purposes of allocating the vessel CIR bandwidth and the vessel MIR bandwidth from the CIR bandwidth pool and the MIR bandwidth pool, respectively.

7. The network bandwidth management device of claim 6, further comprising:
logic to re-configure the satellite to release the guarantee of the vessel CIR bandwidth upon the vessel gaining access to a wireless terrestrial network connection to another moving vessel.

8. The network bandwidth management device of claim 6, further comprising:
logic to re-configure the satellite to release the guarantee of the vessel CIR bandwidth upon the vessel gaining access to a wireless terrestrial network connection to a fixed port antenna.

9. The network bandwidth management device of claim 6, further comprising:
logic to re-configure the satellite to increase a guarantee of a vessel CIR bandwidth of other vessels in the group of vessels upon the release of the guarantee of the vessel CIR bandwidth.

10. The network bandwidth management device of claim 6, further comprising:
logic to influence the guarantee of the vessel CIR bandwidth by a number of pending and unfulfilled network content requests to a local service selector of the vessel.

11. A network bandwidth management system for a group of vessels, comprising:
each vessel of the group of vessels comprising a management interface to a central bandwidth management system and each comprising a satellite connection over which the management interface operates;
the central bandwidth management system comprising logic to configure a satellite providing the satellite connection to associate the group of vessels for purposes of bandwidth allocation on the satellite, and to receive information about connectivity circumstances of each vessel in the group of vessels; and
the central bandwidth management system further comprising:
logic to configure the satellite to guarantee a committed information rate bandwidth (vessel CIR bandwidth) to the each vessel in the group of vessels;
logic to configure the satellite to associate a maximum information rate bandwidth (vessel MIR bandwidth) with the each vessel in the group of vessels;
logic to configure the satellite to combine the vessel CIR bandwidth of the each vessel in the group of vessels into a CIR bandwidth pool for the group of vessels, the CIR bandwidth pool comprising a combined CIR bandwidth;
logic to configure the satellite to combine the vessel MIR bandwidth for the each vessel in the group of vessels into a MIR bandwidth pool for the group of vessels, the MIR bandwidth pool comprising a combined MIR bandwidth;

logic to configure the satellite to provide the each vessel in the group of vessels with a priority burst rate up to the combined CIR bandwidth;

logic to configure the satellite to provide the each vessel in the group of vessels with a burst rate up to the combined MIR bandwidth, conditional on availability of bandwidth beyond the combined CIR bandwidth;

logic to re-configure the satellite to release the guarantee of CIR bandwidth for the particular vessel upon the particular vessel gaining access to a terrestrial network connection of higher speed than the satellite connection;

to configure a new lower but nonzero guarantee of CIR for the particular vessel; and logic to operate a directed wireless data connection between the vessel and another vessel, and to treat the vessel and the another vessel as a single vessel for purposes of allocating the vessel CIR bandwidth and the vessel MIR bandwidth from the CIR bandwidth pool and the MIR bandwidth pool, respectively.

12. The network bandwidth management system of claim 11, further comprising:

logic to re-configure the satellite to release the guarantee of the vessel CIR bandwidth for a particular vessel upon the particular vessel gaining access to a wireless terrestrial network connection to another moving vessel.

13. The network bandwidth management system of claim 11, further comprising:

logic to re-configure the satellite to release the guarantee of the vessel CIR bandwidth for a particular vessel upon the particular vessel gaining access to a wireless terrestrial network connection to a fixed port antenna.

14. The network bandwidth management system of claim 11, further comprising:

logic to re-configure the satellite to increase a guarantee of the vessel CIR bandwidth of other vessels in the group of vessels upon the release of the guarantee of the vessel CIR bandwidth for a particular vessel.

15. The network bandwidth management system of claim 11, further comprising:

logic to influence the guarantee of the vessel CIR bandwidth for a particular vessel by a number of pending and unfulfilled network content requests to a local service selector of the particular vessel.

* * * * *